US012583478B2

(12) United States Patent
Yu et al.

(10) Patent No.: US 12,583,478 B2
(45) Date of Patent: Mar. 24, 2026

(54) AUTONOMOUS DRIVING VEHICLE OCCUPANCY DETECTION METHOD, APPARATUS, ELECTRONIC DEVICE, AND READABLE STORAGE MEDIUM BASED ON THE STATE VEHICLE DOOR AND SEAT BELT

(71) Applicant: BEIJING BAIDU NETCOM SCIENCE TECHNOLOGY CO., LTD., Beijing (CN)

(72) Inventors: Zhihua Yu, Beijing (CN); Jianfeng Sun, Beijing (CN); Yun Zhao, Beijing (CN); Ganghui Wang, Beijing (CN); Yanfu Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 365 days.

(21) Appl. No.: 17/814,135

(22) Filed: Jul. 21, 2022

(65) Prior Publication Data

US 2023/0031709 A1     Feb. 2, 2023

(30) Foreign Application Priority Data

Jul. 28, 2021     (CN) .......................... 202110857044.6

(51) Int. Cl.
B60R 25/34          (2013.01)
B60R 21/015         (2006.01)
          (Continued)

(52) U.S. Cl.
CPC ... B60W 60/0016 (2020.02); B60R 21/01544 (2014.10); B60R 22/48 (2013.01); B60W 2540/01 (2020.02); B60W 2540/049 (2020.02)

(58) Field of Classification Search
CPC ......... B60W 60/0016; B60W 2540/01; B60W 2540/049; B60W 40/08;
          (Continued)

(56) References Cited

U.S. PATENT DOCUMENTS 10,214,118 B1      2/2019  Jain et al.
10,773,683 B1 *   9/2020  Ghannam ............... B60R 22/48
          (Continued)

FOREIGN PATENT DOCUMENTS

CN          103863244 A      6/2014
CN          107839644 A      3/2018
          (Continued)

OTHER PUBLICATIONS

Extended European Search Report for EP22186687.4, issued on Dec. 14, 2022, 8 pgs.
          (Continued)

*Primary Examiner* — Jelani A Smith
*Assistant Examiner* — George A Alcorn, III
(74) *Attorney, Agent, or Firm* — Kwan & Olynick LLP

(57)          ABSTRACT

The present disclosure provides an autonomous driving vehicle occupancy detection method and apparatus, an electronic device and a readable storage medium, and relates to the field of computer technologies, and in particular, to the field of artificial intelligence technologies such as intelligent transportation and autonomous driving technologies. A specific implementation solution involves: acquiring passengers' ride information on an autonomous driving vehicle; determining a vehicle component change state of the autonomous driving vehicle according to the ride information of the autonomous driving vehicle; wherein the vehicle component change state includes a door change state of the autonomous driving vehicle and a seat belt change state of the autonomous driving vehicle; and determining a seat load (Continued)

of the autonomous driving vehicle according to the vehicle component change state of the autonomous driving vehicle.

9 Claims, 4 Drawing Sheets

(51) Int. Cl.
| | | |
|---|---|---|
| *B60W 40/08* | (2012.01) | |
| *B60W 60/00* | (2020.01) | |
| *G06F 9/06* | (2006.01) | |
| *B60R 22/48* | (2006.01) | |

(58) Field of Classification Search
CPC .. B60W 2040/0881; B60W 2050/0005; B60R 22/48; B60R 25/34; B60R 21/01544; B60N 2/002; G06F 9/06
USPC .......................................................... 701/23
See application file for complete search history.

(56) References Cited

U.S. PATENT DOCUMENTS

| | | | | |
|---|---|---|---|---|
| 11,384,832 | B1 * | 7/2022 | Bakalas | ................... F16H 59/08 |
| 2015/0120124 | A1 * | 4/2015 | Bartels | .................. B60W 50/10 |
| | | | | 701/23 |
| 2015/0338849 | A1 * | 11/2015 | Nemec | ................... B60K 28/02 |
| 2016/0297324 | A1 * | 10/2016 | Taylor | ................ B60H 1/00742 |
| 2018/0136655 | A1 | 5/2018 | Kim et al. | |

| | | | | |
|---|---|---|---|---|
| 2018/0181128 | A1 | 6/2018 | Urano | |
| 2019/0054926 | A1 | 2/2019 | Wasekura | |
| 2019/0126911 | A1 | 5/2019 | Nienhueser | |
| 2020/0150660 | A1 | 5/2020 | Kim et al. | |
| 2020/0383580 | A1 * | 12/2020 | Shouldice | ............. B60W 40/08 |
| 2021/0107420 | A1 * | 4/2021 | Schaub | .............. G01R 27/2605 |

FOREIGN PATENT DOCUMENTS

| | | |
|---|---|---|
| CN | 108791157 A | 11/2018 |
| CN | 111340984 A | 6/2020 |
| CN | 111688722 A | 9/2020 |
| EP | 3343180 A1 | 7/2018 |
| JP | 2015082231 A | 4/2015 |
| JP | 2020116998 A | 8/2020 |
| JP | 2020116999 A | 8/2020 |
| KR | 20150132045 A | 11/2015 |
| KR | 101756102 B1 | 7/2017 |

OTHER PUBLICATIONS

Chinese First Office Action Dated Mar. 3, 2022 for Chinese Application No. 202110857044.6, 13 Pages.
Chinese Notice of Allowance Dated May 23, 2022 for Chinese Application No. 202110857044.6, 3 Pages.
MS Office Advanced Applications—EN-CN_Combined, Feb. 29, 2020, 12 pages.
Communication pursuant to EPC for EP22186687.4, issued on Sep. 7, 2023, 6 pgs.
First office action for JP2022-117766, issued on Aug. 1, 2023, 2 pgs.

* cited by examiner

AUTONOMOUS DRIVING VEHICLE OCCUPANCY DETECTION METHOD, APPARATUS, ELECTRONIC DEVICE, AND READABLE STORAGE MEDIUM BASED ON THE STATE VEHICLE DOOR AND SEAT BELT

The present application claims the priority of Chinese Patent Application No. 202110857044.6, filed on Jul. 28, 2021, with the title of "AUTONOMOUS DRIVING VEHICLE DETECTION METHOD AND APPARATUS, ELECTRONIC DEVICE AND READABLE STORAGE MEDIUM". The disclosure of the above application is incorporated herein by reference in its entirety.

FIELD OF THE DISCLOSURE

The present disclosure relates to the field of computer technologies, specifically to the field of artificial intelligence technologies such as intelligent transportation and autonomous driving technologies, and in particular, to an autonomous driving vehicle detection method and apparatus, an electronic device and a readable storage medium.

BACKGROUND OF THE DISCLOSURE

In order to ensure the safe driving of autonomous driving vehicles, there is a need to detect passenger seating/unseating in the autonomous driving vehicles.

At present, the solution of detecting passenger seating/unseating in an autonomous driving vehicle is to detect whether a passenger is seated/unseated by collecting state information of a pressure sensor mounted under the seat of the autonomous driving vehicle.

SUMMARY OF THE DISCLOSURE

The present disclosure provides an autonomous driving vehicle detection method and apparatus, an electronic device and a readable storage medium.

According to one aspect of the present disclosure, a method for detecting occupancy in an autonomous driving vehicle is provided, including:

acquiring passengers' ride information on an autonomous driving vehicle;

determining a vehicle component change state of the autonomous driving vehicle according to the ride information of the autonomous driving vehicle; wherein the vehicle component change state includes a door change state of the autonomous driving vehicle and a seat belt change state of the autonomous driving vehicle; and determining a seat load of the autonomous driving vehicle according to the vehicle component change state of the autonomous driving vehicle.

According to another aspect of the present disclosure, there is provided an electronic device, including:

at least one processor; and a memory communicatively connected with the at least one processor;

wherein the memory stores instructions executable by the at least one processor, and the instructions are executed by the at least one processor to enable the at least one processor to perform a method for detecting occupancy in an autonomous driving vehicle, wherein the method includes:

acquiring passengers' ride information on an autonomous driving vehicle;

determining a vehicle component change state of the autonomous driving vehicle according to the ride information of the autonomous driving vehicle; wherein the vehicle component change state includes a door change state of the autonomous driving vehicle and a seat belt change state of the autonomous driving vehicle; and determining a seat load of the autonomous driving vehicle according to the vehicle component change state of the autonomous driving vehicle.

According to a further aspect of the present disclosure, there is provided a non-transitory computer readable storage medium with computer instructions stored thereon, wherein the computer instructions are used for causing a method for detecting occupancy in an autonomous driving vehicle, wherein the method includes:

acquiring passengers' ride information on an autonomous driving vehicle;

determining a vehicle component change state of the autonomous driving vehicle according to the ride information of the autonomous driving vehicle; wherein the vehicle component change state includes a door change state of the autonomous driving vehicle and a seat belt change state of the autonomous driving vehicle; and determining a seat load of the autonomous driving vehicle according to the vehicle component change state of the autonomous driving vehicle.

According to a further aspect of the present disclosure, there is provided an autonomous driving vehicle, including an electronic device including:

at least one processor; and a memory communicatively connected with the at least one processor;

wherein the memory stores instructions executable by the at least one processor, and the instructions are executed by the at least one processor to enable the at least one processor to perform a method for detecting occupancy in an autonomous driving vehicle, wherein the method includes:

acquiring passengers' ride information on an autonomous driving vehicle;

determining a vehicle component change state of the autonomous driving vehicle according to the ride information of the autonomous driving vehicle; wherein the vehicle component change state includes a door change state of the autonomous driving vehicle and a seat belt change state of the autonomous driving vehicle; and determining a seat load of the autonomous driving vehicle according to the vehicle component change state of the autonomous driving vehicle.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, Personal Digital Assistants (PDAs), wireless handheld devices, and Tablet Computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

With the continuous development of an autonomous driving technology, there is no driver in operating autonomous driving vehicles. In order to ensure the safe driving of the autonomous driving vehicles, there is a need to detect passenger seating/unseating in the autonomous driving vehicles.

At present, the solution of detecting passenger seating/unseating in an autonomous driving vehicle is to detect whether a passenger is seated/unseated by collecting state information of a pressure sensor mounted under the seat of the autonomous driving vehicle. However, the solution requires the mounting of a pressure sensor behind each seat of the autonomous driving vehicle, which may cause physical damages to the seat and affect the service life of the seat during the mounting. Moreover, a controller to collect state information of the pressure sensor is required to be added, which further increases the costs.

Therefore, there is an urgent need to provide a method for detecting autonomous driving vehicle, so as to conveniently and effectively detect passenger seating/unseating in autonomous driving vehicles, thereby ensuring the safety and reliability of the driving of the autonomous driving vehicles.

Figure 1:
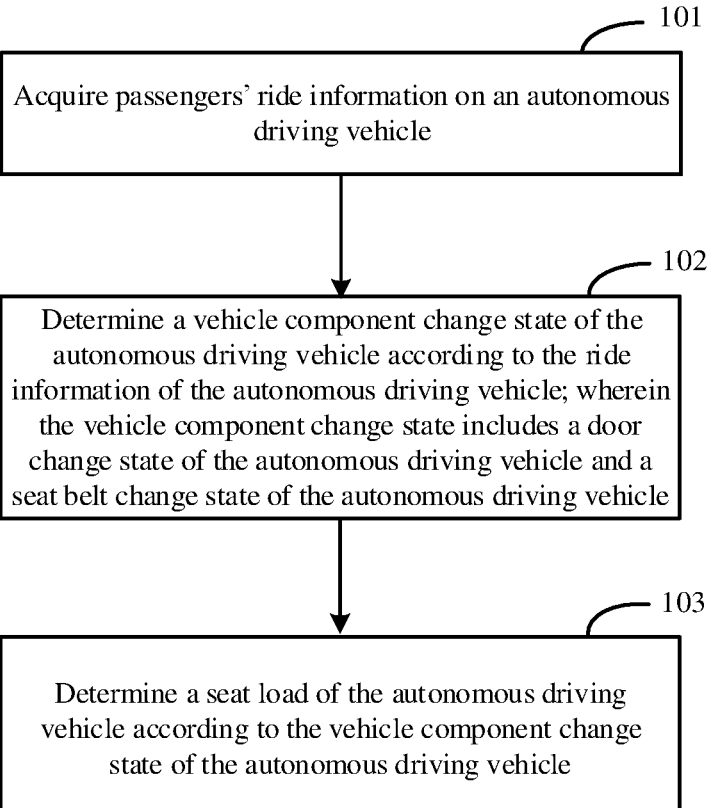
FIG. 1 is a schematic diagram according to a first embodiment of the present disclosure.

FIG. 1 is a schematic diagram according to a first embodiment of the present disclosure, as shown in FIG. 1.

In 101, passengers' ride information on an autonomous driving vehicle is acquired.

In 102, a vehicle component change state of the autonomous driving vehicle is determined according to the ride information of the autonomous driving vehicle; wherein the vehicle component change state includes a door change state of the autonomous driving vehicle and a seat belt change state of the autonomous driving vehicle.

In 103, a seat load of the autonomous driving vehicle is determined according to the vehicle component change state of the autonomous driving vehicle.

It is to be noted that 101 to 103 may be partially or wholly performed by an application located in a local terminal, or a functional unit arranged in an application located in a local terminal such as a plug-in or a Software Development Kit (SDK), or a processing engine in a server located on a network side, or a distributed system located on the network side, such as a processing engine or a distributed system in an autonomous driving processing platform on the network side, which is not particularly limited in this embodiment.

It may be understood that the application may be a nativeApp installed on a local terminal, or a webApp of a browser on a local terminal, which is not limited in this embodiment.

In this way, passengers' ride information on an autonomous driving vehicle is acquired, and then a vehicle component change state of the autonomous driving vehicle is determined according to the ride information of the autonomous driving vehicle, wherein the vehicle component change state includes a door change state of the autonomous driving vehicle and a seat belt change state of the autonomous driving vehicle, so that a seat load of the autonomous driving vehicle can be determined according to the vehicle component change state of the autonomous driving vehicle. The determination of the seat load of the autonomous driving vehicle jointly by combining two vehicle component change states, i.e., the door change state of the autonomous driving vehicle and the seat belt change state of the autonomous driving vehicle, can realize detection of passenger seating/unseating in the autonomous driving vehicle accurately, thereby ensuring the safety and reliability of the driving of the autonomous driving vehicle.

Optionally, in one possible implementation of this embodiment, the ride information of the autonomous driving vehicle acquired by performing 101 may include, but is not limited to, door use information of the autonomous driving vehicle, which is not particularly limited in this embodiment.

In 102, specifically, a door state of the autonomous driving vehicle may be obtained according to the door use information of the autonomous driving vehicle, and then the door change state of the autonomous driving vehicle may be obtained according to the door state of the autonomous driving vehicle.

In the implementation, the door use information may include a door state signal. The door state signal may include door open and door closed.

Specifically, door open may indicate that a door of the vehicle is opened by a passenger at this point; door closed may indicate that the door of the vehicle is closed by the passenger at this point.

In the implementation, the door state may include, but is not limited to, a door closed state and a door open state.

In the implementation, if door closed is first obtained, door open is then obtained, and door closed is further obtained within a specified time, it may be obtained according to a door state signal of door closed, a door state signal of door open and a door state signal of door closed that the door states are the door closed state, the door open state and the door closed state. Therefore, it may be obtained that the door change state of the autonomous driving vehicle is from the door closed state to the door open state and then back to the door closed state.

For example, a passenger is required to open the door before getting on or off the vehicle. In this process, before the passenger opens the door, the door state signal is door closed, after the passenger opens the door, the door state signal changes to door open, and after the passenger closes the door again, the door state signal changes to door closed. Then, in this process, the obtained door states are the door closed state, the door open state and the door closed state. Then, it may be obtained that the door change state of the autonomous driving vehicle is from the door closed state to the door open state and then back to the door closed state.

In the implementation, the door change state of the autonomous driving vehicle may be obtained conveniently and effectively according to the door use information of the autonomous driving vehicle, which helps more accurately determine the seat load of the autonomous driving vehicle and then accurately detect passenger seating/unseating in the autonomous driving vehicle.

Optionally, in one possible implementation of this embodiment, the ride information of the autonomous driving vehicle acquired by performing 101 may further include, but is not limited to, seat belt use information of the autonomous driving vehicle, which is not particularly limited in this embodiment.

In 102, specifically, a seat belt state of the autonomous driving vehicle may be obtained according to the seat belt use information of the autonomous driving vehicle, and then the seat belt change state of the autonomous driving vehicle may be obtained according to the seat belt state of the autonomous driving vehicle.

In the implementation, the seat belt use information may include, but is not limited to, a seat belt alarm signal. The seat belt alarm signal may include alarm ON and alarm OFF.

Specifically, alarm ON may indicate that a passenger sits on the seat of the vehicle at this point and the passenger does not use the seat belt safely. Alarm OFF may indicate that a passenger sits on the seat of the vehicle at this point and the passenger has used the seat belt safely or that no passenger sits on the seat of the vehicle at this point.

In the implementation, the seat belt state may include, but is not limited to, a seat belt unsafe use state and a seat belt safe use state.

In the implementation, if alarm ON is first obtained and alarm OFF is then obtained within a specified time, it may be obtained according to a seat belt alarm signal of alarm ON and a seat belt alarm signal of alarm OFF that the seat belt states are the seat belt unsafe use state and the seat belt safe use state. Therefore, it may be obtained that the seat belt change state of the autonomous driving vehicle is from the seat belt unsafe use state to the seat belt safe use state.

For example, a passenger is required to wear a seat belt after getting into the vehicle and sitting on the seat. In this process, before the passenger wears the seat belt, the seat belt alarm signal is alarm ON, and after the passenger wears the seat belt, the seat belt alarm signal changes to alarm OFF. Then, in this process, the obtained seat belt states are the seat belt unsafe use state and the seat belt safe use state. Then, it may be obtained that the seat belt change state of the autonomous driving vehicle is from the seat belt unsafe use state to the seat belt safe use state.

Alternatively, in another example, before getting out of the vehicle, the passenger is required to unfasten the seat belt and then leave the seat to move to an exit door. In this process, after the passenger unfastens the seat belt, the seat belt alarm signal is alarm ON, and after the passenger leaves the seat, the seat belt alarm signal changes to alarm OFF. Then, in this process, the obtained seat belt states are the seat belt unsafe use state and the seat belt safe use state. Then, it may be obtained that the seat belt change state of the autonomous driving vehicle is from the seat belt unsafe use state to the seat belt safe use state.

In the implementation, the seat belt change state of the autonomous driving vehicle may be obtained conveniently and effectively according to the seat belt use information of the autonomous driving vehicle, which helps more accurately determine the seat load of the autonomous driving vehicle and then accurately detect passenger seating/unseating in the autonomous driving vehicle.

Optionally, in one possible implementation of this embodiment, the ride information of the autonomous driving vehicle acquired by performing 101 may include, but is not limited to, door use information of the autonomous driving vehicle and seat belt use information of the autonomous driving vehicle, which is not particularly limited in this embodiment.

In 102, specifically, a door state of the autonomous driving vehicle may be obtained according to the door use information of the autonomous driving vehicle, and then the door change state of the autonomous driving vehicle may be obtained according to the door state of the autonomous driving vehicle; and a seat belt state of the autonomous driving vehicle may be further obtained according to the seat belt use information of the autonomous driving vehicle, and then the seat belt change state of the autonomous driving vehicle may be obtained according to the seat belt state of the autonomous driving vehicle. A detailed description may be obtained with reference to the related content in the foregoing implementation, which is not described in detail herein.

Optionally, in one possible implementation of this embodiment, prior to 102, specifically, passenger order information of the autonomous driving vehicle may be acquired. Then, a number of passengers served by the autonomous driving vehicle may be determined according to the passenger order information of the autonomous driving vehicle. Then, vehicle components of the autonomous driving vehicle that provide services may be determined according to the number of passengers served by the autonomous driving vehicle, so as to determine, according to the ride information of the autonomous driving vehicle, vehicle component change states of the vehicle components of the autonomous driving vehicle that provide services.

In the implementation, a passenger may submit travel demand information through a travel service application, and the travel service application generates corresponding passenger order information according to the travel demand information submitted by the passenger, and distributes the passenger order information to an autonomous driving vehicle that can provide services through a travel server corresponding to the travel service application. After receiving the passenger order information, the autonomous driving vehicle that can provide services may provide a travel service for the corresponding passenger according to the received passenger order information.

Alternatively, in addition to receiving the passenger order information sent by the travel server corresponding to the travel service application, the autonomous driving vehicle that can provide services may further send an acquisition request to the travel server corresponding to the travel service application to acquire passenger order information, and then provide a travel service for the corresponding passenger according to the acquired passenger order information.

In the implementation, the passenger order information may include, but is not limited to, at least one of a number of passengers served, place of departure and destination, which is not limited in this embodiment.

According to the number of passengers served by the autonomous driving vehicle, vehicle components of the autonomous driving vehicle that provide services, such as a door and a seat belt, may be determined.

For example, if the number of passengers served is 2, it is determined that the door that can provide services may be a right rear door and the seat belt may be a seat belt of a rear seat. Therefore, the personal safety of the passengers when getting on the vehicle can be further ensured.

In the implementation, the number of passengers served by the autonomous driving vehicle may be determined according to the acquired passenger order information of the autonomous driving vehicle, vehicle components of the autonomous driving vehicle that provide services, that is, specific vehicle components of the autonomous driving vehicle, are then determined according to the number of passengers served by the autonomous driving vehicle, and change states of the vehicle components of the autonomous driving vehicle that provide services are determined. Therefore, change states of specific vehicle components of the autonomous driving vehicle may be obtained based on a passenger's demand, and a specific seat load of the autonomous driving vehicle is then determined according to the change states of the specific vehicle components of the autonomous driving vehicle, so that the seat load of the autonomous driving vehicle can be detected in a more targeted manner, and then the reliability and accuracy of detection of passenger seating/unseating in the autonomous driving vehicle can be improved.

Optionally, in one possible implementation of this embodiment, after the vehicle components of the autonomous driving vehicle that provide services are determined according to the manner in the foregoing embodiment, vehicle component change states of the vehicle components of the autonomous driving vehicle that provide services may be determined in combination with specific implementations of 102 in the foregoing implementation, and then the seat load of the autonomous driving vehicle can be determined according to the vehicle component change states of the autonomous driving vehicle. A detailed description may be obtained with reference to the related content in the foregoing implementation, which is not described in detail herein.

During one preferred implementation, the ride information of the autonomous driving vehicle acquired by performing 101 may further include, but is not limited to, door use information of the autonomous driving vehicle and seat belt use information of the autonomous driving vehicle, which is not particularly limited in this embodiment.

Specifically, in 102, a door state of the autonomous driving vehicle may be obtained according to the door use information of the autonomous driving vehicle, and the door change state of the autonomous driving vehicle may be obtained according to the door state of the autonomous driving vehicle. Further, a seat belt state of the autonomous driving vehicle may be obtained according to the seat belt use information of the autonomous driving vehicle, and the seat belt change state of the autonomous driving vehicle may be obtained according to the seat belt state of the autonomous driving vehicle. A detailed description may be obtained with reference to the related content in the foregoing method embodiment, which is not described in detail herein.

Optionally, in one possible implementation of this embodiment, in 103, specifically, the seat load of the autonomous driving vehicle may be determined according to a timing relationship between the door change state of the autonomous driving vehicle and the seat belt change state of the autonomous driving vehicle.

During one specific implementation, in a case where the door change state of the autonomous driving vehicle is from a door closed state to a door open state and then back to the door closed state, the seat load of the autonomous driving vehicle is determined as a passenger seating state if the seat belt change state of the autonomous driving vehicle is from a seat belt unsafe use state to a seat belt safe use state; or During this specific implementation, firstly, the door of the autonomous driving vehicle in the closed state may be opened by a passenger about to get on the vehicle, the passenger enters the vehicle, and then the door of the autonomous driving vehicle in the open state may be closed by the passenger. In this case, the obtained door change state of the autonomous driving vehicle is from the door closed state to the door open state and then back to the door closed state.

Then, the passenger entering the vehicle sits on a seat and wears a seat belt on the seat. In this case, the obtained seat belt change state of the autonomous driving vehicle is from the seat belt unsafe use state to the seat belt safe use state.

Finally, in a case where it is first obtained that the door change state of the autonomous driving vehicle is from a door closed state to a door open state and then back to the door closed state, the seat load of the autonomous driving vehicle may be determined as a passenger seating state if the obtained seat belt change state of the autonomous driving vehicle is from a seat belt unsafe use state to a seat belt safe use state.

So far, after confirming that the seat load of the autonomous driving vehicle is a passenger seating state, the autonomous driving vehicle may further start a corresponding autonomous driving trip according to the passenger order information.

During another specific implementation, in a case where the seat belt change state of the autonomous driving vehicle is from a seat belt unsafe use state to a seat belt safe use state, the seat load of the autonomous driving vehicle may be determined as a passenger unseating state if the door change state of the autonomous driving vehicle is from a door closed state to a door open state and then back to the door closed state.

During this specific implementation, firstly, a passenger about to get off the vehicle unfastens the seat belt, and then leaves the seat to move to the exit door of the vehicle. In this case, the obtained seat belt change state of the autonomous driving vehicle is from the seat belt unsafe use state to the seat belt safe use state.

Then, the door of the autonomous driving vehicle in the closed state may be opened by the passenger about to get off the vehicle, the passenger gets out of the vehicle, and then the door of the autonomous driving vehicle in the open state is closed by the passenger. In this case, the obtained door change state of the autonomous driving vehicle is from a door closed state to a door open state and then back to the door closed state.

Finally, in a case where it is first obtained that the seat belt change state of the autonomous driving vehicle is from a seat belt unsafe use state to a seat belt safe use state, the seat load of the autonomous driving vehicle may be determined as a passenger unseating state if the door change state of the autonomous driving vehicle is from a door closed state to a door open state and then back to the door closed state.

So far, after confirming that the seat load of the autonomous driving vehicle is a passenger unseating state, the autonomous driving vehicle enters a state of service availability, that is, a state of receiving a next piece of passenger order information.

In the implementation, the door change state of the autonomous driving vehicle and the seat belt change state of the autonomous driving vehicle may be sequentially detected according to a timing relationship between the door change state of the autonomous driving vehicle and the seat belt change state of the autonomous driving vehicle, and it is determined jointly according to the two change states whether the seat load of the autonomous driving vehicle is a passenger seating state or a passenger unseating state, so as to more accurately detect passenger seating/unseating in the autonomous driving vehicle, thereby ensuring the safety and reliability of the driving of the autonomous driving vehicle.

Optionally, in one possible implementation of this embodiment, 103 may be performed after the vehicle component change state of the autonomous driving vehicle is determined according to the manner in the foregoing implementation. A detailed description may be obtained with reference to the related content in the foregoing method embodiment, which is not described in detail herein.

In this embodiment, passengers' ride information on an autonomous driving vehicle is acquired, and then a vehicle component change state of the autonomous driving vehicle is determined according to the ride information of the autonomous driving vehicle, wherein the vehicle component change state includes a door change state of the autonomous driving vehicle and a seat belt change state of the autonomous driving vehicle, so that a seat load of the autonomous driving vehicle can be determined according to the vehicle component change state of the autonomous driving vehicle. The determination of the seat load of the autonomous driving vehicle jointly by combining two vehicle component change states, i.e., the door change state of the autonomous driving vehicle and the seat belt change state of the autonomous driving vehicle, can realize detection of passenger seating/unseating in the autonomous driving vehicle accurately, thereby ensuring the safety and reliability of the driving of the autonomous driving vehicle.

In this embodiment, the door change state of the autonomous driving vehicle may be obtained conveniently and effectively according to the door use information of the autonomous driving vehicle, which helps more accurately determine the seat load of the autonomous driving vehicle and then accurately detect passenger seating/unseating in the autonomous driving vehicle.

In this embodiment, the seat belt change state of the autonomous driving vehicle may be obtained conveniently and effectively according to the seat belt use information of the autonomous driving vehicle, which helps more accurately determine the seat load of the autonomous driving vehicle and then accurately detect passenger seating/unseating in the autonomous driving vehicle.

In this embodiment, change states of specific vehicle components of the autonomous driving vehicle may be obtained based on a passenger's demand, and a specific seat load of the autonomous driving vehicle is then determined according to the change states of the specific vehicle components of the autonomous driving vehicle, so that the seat load of the autonomous driving vehicle can be detected in a more targeted manner, and then the reliability and accuracy of detection of passenger seating/unseating in the autonomous driving vehicle can be further improved.

In this embodiment, the door change state of the autonomous driving vehicle and the seat belt change state of the autonomous driving vehicle may be sequentially detected according to a timing relationship between the door change state of the autonomous driving vehicle and the seat belt change state of the autonomous driving vehicle, and it is determined jointly according to the two change states whether the seat load of the autonomous driving vehicle is a passenger seating state or a passenger unseating state, so as to more accurately detect passenger seating/unseating in the autonomous driving vehicle, thereby ensuring the safety and reliability of the driving of the autonomous driving vehicle.

In addition, by use of the technical solution according to this embodiment, there is no need to mount additional hardware devices, thereby reducing the operation of breaking the original equipment in the vehicle, ensuring the service life of the original equipment in the vehicle and saving the costs.

In addition, by use of the technical solution according to this embodiment, user experience can be effectively improved.

Figure 2:
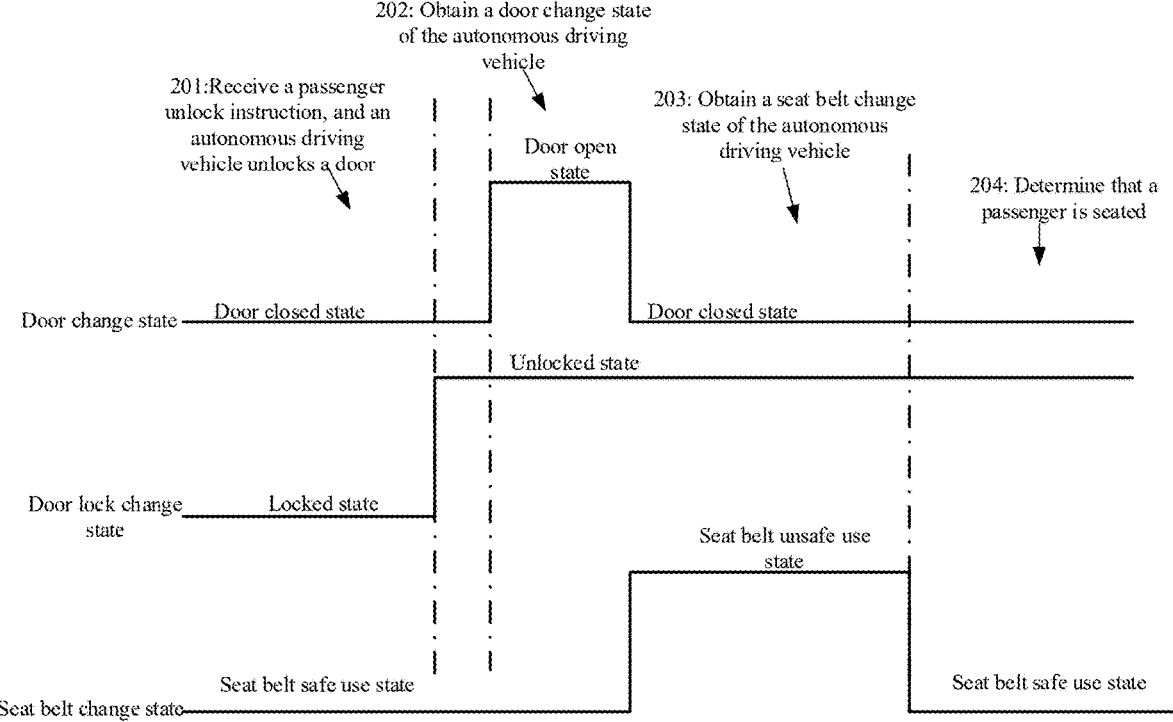
FIG. 2 is a schematic diagram according to a second embodiment of the present disclosure.

FIG. 2 is a schematic diagram according to a second embodiment of the present disclosure, as shown in FIG. 2.

In 201, a passenger unlock instruction is received, and an autonomous driving vehicle unlocks a door.

In 202, a door change state of the autonomous driving vehicle is obtained.

In 203, a seat belt change state of the autonomous driving vehicle is obtained.

In 204, it is determined that a passenger is seated.

It is to be noted that 201 to 204 may represent a process of detecting passenger seating during actual operation of the autonomous driving vehicle.

Optionally, in one possible implementation of this embodiment, in 201, firstly, a passenger submits a vehicle hailing request through the travel service application, and the travel service application may generate an order of the passenger. The order includes passenger order information.

In the implementation, the travel service application may actively distribute the passenger order information to the autonomous driving vehicle through the corresponding travel server, or the autonomous driving vehicle may send an acquisition request to the travel server corresponding to the travel service application to acquire passenger order information. After obtaining the passenger order information, namely receiving the order, the autonomous driving vehicle may provide a travel service for the corresponding passenger.

Then, after receiving the order, the autonomous driving vehicle may first drive to the passenger's place of departure, namely the passenger's pickup point. After the autonomous driving vehicle reaches the passenger's pickup point, the passenger sends door unlock information to the autonomous driving vehicle.

Specifically, the passenger may scan a QR code of the autonomous driving vehicle to send the door unlock information to the autonomous driving vehicle, or the passenger may click a door unlock button in the travel service application to send the door unlock information to the autonomous driving vehicle.

Finally, after confirming that the received door unlock information is correct information, the autonomous driving vehicle may unlock the door. In this process, before the autonomous driving vehicle unlocks the door, a door lock signal is Locked, and after the autonomous driving vehicle unlocks the door, the door lock signal is Unlocked. Then, in this process, the obtained door lock state of the door of the autonomous driving vehicle is a locked state and an unlocked state. Then, it may be obtained that a door lock change state of the door of the autonomous driving vehicle is from the locked state to the unlocked state.

It may be understood that the manner of unlocking the door of the autonomous driving vehicle may also be other existing unlocking manners, which is not limited in this embodiment.

Optionally, in one possible implementation of this embodiment, in 202, the door use information of the autonomous driving vehicle may be acquired first, a door state of the autonomous driving vehicle is obtained according to the door use information of the autonomous driving vehicle, and then the door change state of the autonomous driving vehicle may be obtained according to the door state of the autonomous driving vehicle.

Specifically, after the passenger unlocks the door, the passenger may open the door to enter the vehicle and close the door. During this operation, before the passenger opens the door, the door state signal is door closed, after the passenger opens the door, the door state signal changes to door open, and after the passenger closes the door again, the door state signal changes to door closed. Then, in this process, the obtained door states are the door closed state, the door open state and the door closed state. Then, it may be obtained that the door change state of the autonomous driving vehicle is from the door closed state to the door open state and then back to the door closed state.

Optionally, in one possible implementation of this embodiment, after the door change state of the autonomous driving vehicle is obtained by performing 202, in 203, the seat belt use information of the autonomous driving vehicle may be acquired first, a seat belt state of the autonomous driving vehicle is obtained according to the seat belt use information of the autonomous driving vehicle, and then the seat belt change state of the autonomous driving vehicle may be obtained according to the seat belt state of the autonomous driving vehicle.

In the implementation, after getting on the vehicle and sitting on a seat, the passenger has to wear a seat belt. Before the passenger wears the seat belt, the seat belt alarm signal is alarm ON, and after the passenger wears the seat belt, the seat belt alarm signal changes to alarm OFF. Then, in this process, the obtained seat belt states are the seat belt unsafe use state and the seat belt safe use state. Then, it may be obtained that the seat belt change state of the autonomous driving vehicle is from the seat belt unsafe use state to the seat belt safe use state.

Optionally, in one possible implementation of this embodiment, in 204, it may be determined according to a timing relationship of performing 202 to 303, namely the obtained timing relationship between the door change state of the autonomous driving vehicle and the seat belt change state of the autonomous driving vehicle, that the passenger is seated.

In this implementation, in a case where the door change state of the autonomous driving vehicle is from a door closed state to a door open state and then back to the door closed state, the seat load of the autonomous driving vehicle may be determined as a passenger seating state if the seat belt change state of the autonomous driving vehicle is from a seat belt unsafe use state to a seat belt safe use state.

Optionally, in one possible implementation of this embodiment, subsequent to 204, after confirming that states of all passengers are passenger seating states, the autonomous driving vehicle may lock the door, and the door lock change state is from unlocked to locked. A corresponding autonomous driving is started according to the passenger order information.

In this embodiment, in a case where it is confirmed that the door of the autonomous driving vehicle is unlocked, in this implementation, the seat load of the autonomous driving vehicle is determined jointly by combining two vehicle component change states, i.e., the door change state of the autonomous driving vehicle and the seat belt change state of the autonomous driving vehicle, so that passenger seating in the autonomous driving vehicle can be detected accurately, thereby ensuring the safety and reliability of the driving of the autonomous driving vehicle.

Figure 3:
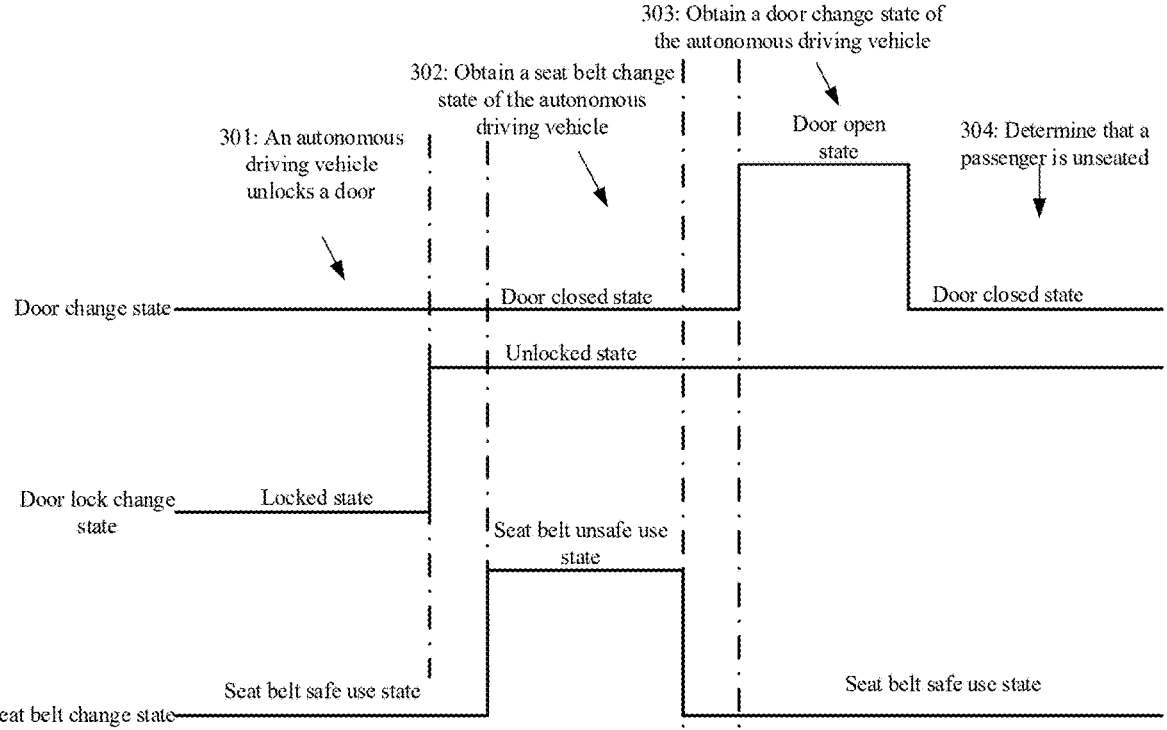
FIG. 3 is a schematic diagram according to a third embodiment of the present disclosure.

FIG. 3 is a schematic diagram according to a third embodiment of the present disclosure, as shown in FIG. 3.

In 301, an autonomous driving vehicle unlocks a door.

In 302, a seat belt change state of the autonomous driving vehicle is obtained.

In 303, a door change state of the autonomous driving vehicle is obtained.

In 304, it is determined that a passenger is unseated.

It is to be noted that 301 to 304 may represent a process of detecting passenger unseating during actual operation of the autonomous driving vehicle.

Optionally, in one possible implementation of this embodiment, in 301, at the end of a passenger's trip, the autonomous driving vehicle may unlock the door after parking. Before the autonomous driving vehicle unlocks the door, a door lock signal is Locked, and after the autonomous driving vehicle unlocks the door, the door lock signal is Unlocked. Then, in this process, the obtained door lock state of the door of the autonomous driving vehicle is a locked state and an unlocked state. Then, it may be obtained that a door lock change state of the door of the autonomous driving vehicle is from the locked state to the unlocked state.

It may be understood that the manner of unlocking the door of the autonomous driving vehicle may also be other existing unlocking manners, which is not limited in this embodiment.

Optionally, in one possible implementation of this embodiment, in 302, the seat belt use information of the autonomous driving vehicle may be acquired first, a seat belt state of the autonomous driving vehicle is obtained according to the seat belt use information of the autonomous driving vehicle, and then the seat belt change state of the autonomous driving vehicle may be obtained according to the seat belt state of the autonomous driving vehicle.

In the implementation, after the autonomous driving vehicle drives to a destination, the passenger is ready to get off the vehicle, and the passenger may first unfasten the seat belt and leave the seat to move to the exit door. During this operation, after the passenger unfastens the seat belt, the seat belt alarm signal is alarm ON, and after the passenger leaves the seat, the seat belt alarm signal changes to alarm OFF. Then, in this process, the obtained seat belt states are the seat belt unsafe use state and the seat belt safe use state. Then, it may be obtained that the seat belt change state of the autonomous driving vehicle is from the seat belt unsafe use state to the seat belt safe use state.

Optionally, in one possible implementation of this embodiment, after the seat belt change state of the autonomous driving vehicle is obtained by performing 302, in 303, the door use information of the autonomous driving vehicle may be acquired first, a door state of the autonomous driving vehicle is obtained according to the door use information of the autonomous driving vehicle, and then the door change state of the autonomous driving vehicle may be obtained according to the door state of the autonomous driving vehicle.

In the implementation, the passenger leaves the seat, arrives at the door, opens the door, gets out, and closes the door. In this process, before the passenger opens the door, the door state signal is door closed, after the passenger opens the door, the door state signal changes to door open, and after the passenger closes the door again, the door state signal changes to door closed. Then, in this process, the obtained door states are the door closed state, the door open state and the door closed state. Then, it may be obtained that the door change state of the autonomous driving vehicle is from the door closed state to the door open state and then back to the door closed state.

Optionally, in one possible implementation of this embodiment, in 304, it may be determined according to a timing relationship of performing 302 to 303, namely the obtained timing relationship between the seat belt change state of the autonomous driving vehicle and the door change state of the autonomous driving vehicle, that the passenger is unseated.

In the implementation, in a case where the seat belt change state of the autonomous driving vehicle is from a seat belt unsafe use state to a seat belt safe use state, the seat load of the autonomous driving vehicle is determined as a passenger unseating state if the door change state of the autonomous driving vehicle is from a door closed state to a door open state and then back to the door closed state.

Optionally, in one possible implementation of this embodiment, subsequent to 304, after confirming that states of all passengers are passenger unseating states and the doors are closed, the autonomous driving vehicle may lock the door and enter a state of order receiving.

In this embodiment, in a case where it is confirmed that the door of the autonomous driving vehicle is unlocked, in this implementation, the seat load of the autonomous driving vehicle is determined jointly by combining two vehicle component change states, i.e., the door change state of the autonomous driving vehicle and the seat belt change state of the autonomous driving vehicle, so that passenger unseating in the autonomous driving vehicle can be detected accurately, thereby ensuring the safety and reliability of the driving of the autonomous driving vehicle.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. Further, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

Figure 4:
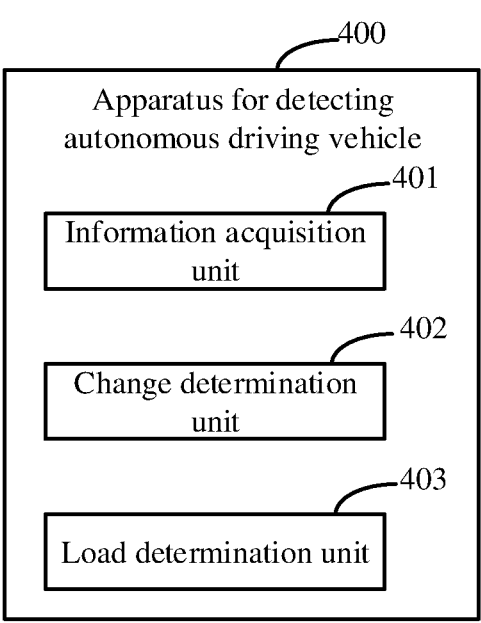
FIG. 4 is a schematic diagram according to a fourth embodiment of the present disclosure.

FIG. 4 is a schematic diagram according to a fourth embodiment of the present disclosure, as shown in FIG. 4. An apparatus 400 for detecting autonomous driving vehicle in this embodiment may include an information acquisition unit 401, a change determination unit 402 and a load determination unit 403. The information acquisition unit 401 is configured to acquire passengers' ride information on an autonomous driving vehicle. The change determination unit 402 is configured to determine a vehicle component change state of the autonomous driving vehicle according to the ride information of the autonomous driving vehicle; wherein the vehicle component change state includes a door change state of the autonomous driving vehicle and a seat belt change state of the autonomous driving vehicle. The load determination unit 403 is configured to determine a seat load of the autonomous driving vehicle according to the vehicle component change state of the autonomous driving vehicle.

It is to be noted that the apparatus for detecting autonomous driving vehicle in this embodiment may be partially or wholly an application located in a local terminal, or a functional unit arranged in an application located in a local terminal such as a plug-in or an SDK, or a processing engine in a server located on a network side, or a distributed system located on the network side, such as a processing engine or a distributed system in an autonomous driving platform on the network side, which is not particularly limited in this embodiment.

It may be understood that the application may be a nativeApp installed on a local terminal, or a webApp of a browser on a local terminal, which is not limited in this embodiment.

Optionally, in one possible implementation of this embodiment, the ride information of the autonomous driving vehicle includes door use information of the autonomous driving vehicle; and the change determination unit 402 is specifically configured to obtain a door state of the autonomous driving vehicle according to the door use information of the autonomous driving vehicle; and obtain the door change state of the autonomous driving vehicle according to the door state of the autonomous driving vehicle.

Optionally, in one possible implementation of this embodiment, the ride information of the autonomous driving vehicle includes seat belt use information of the autonomous driving vehicle; and the change determination unit 402 is specifically configured to obtain a seat belt state of the autonomous driving vehicle according to the seat belt use information of the autonomous driving vehicle; and obtain a seat belt change state of the autonomous driving vehicle according to the seat belt state of the autonomous driving vehicle.

Optionally, in one possible implementation of this embodiment, the change determination unit 402 is further configured to acquire passenger order information of the autonomous driving vehicle; determine a number of passengers served by the autonomous driving vehicle according to the passenger order information of the autonomous driving vehicle; and determine, according to the number of passengers served by the autonomous driving vehicle, vehicle components of the autonomous driving vehicle that provide services, so as to determine, according to the ride information of the autonomous driving vehicle, vehicle component change states of the vehicle components of the autonomous driving vehicle that provide services.

Optionally, in one possible implementation of this embodiment, the load determination unit 403 is specifically configured to determine the seat load of the autonomous driving vehicle according to a timing relationship between the door change state of the autonomous driving vehicle and the seat belt change state of the autonomous driving vehicle.

For example, the load determination unit 403 may be further configured to, in a case where the door change state of the autonomous driving vehicle is from a door closed state to a door open state and then back to the door closed state, determine the seat load of the autonomous driving vehicle as a passenger seating state if the seat belt change state of the autonomous driving vehicle is from a seat belt unsafe use state to a seat belt safe use state.

Alternatively, in another example, the load determination unit 403 may be further configured to, in a case where the seat belt change state of the autonomous driving vehicle is from a seat belt unsafe use state to a seat belt safe use state, determine the seat load of the autonomous driving vehicle as a passenger unseating state if the door change state of the autonomous driving vehicle is from a door closed state to a door open state and then back to the door closed state.

In this embodiment, the information acquisition unit acquires passengers' ride information on an autonomous driving vehicle, and then the change determination unit determines a vehicle component change state of the autonomous driving vehicle according to the ride information of the autonomous driving vehicle, wherein the vehicle component change state includes a door change state of the autonomous driving vehicle and a seat belt change state of the autonomous driving vehicle, so that the load determination unit can determine a seat load of the autonomous driving vehicle according to the vehicle component change state of the autonomous driving vehicle. The determination of the seat load of the autonomous driving vehicle jointly by combining two vehicle component change states, i.e., the door change state of the autonomous driving vehicle and the seat belt change state of the autonomous driving vehicle, can realize detection of passenger seating/unseating in the autonomous driving vehicle accurately, thereby ensuring the safety and reliability of the driving of the autonomous driving vehicle.

In this embodiment, the door change state of the autonomous driving vehicle may be obtained conveniently and effectively according to the door use information of the autonomous driving vehicle, which helps more accurately determine the seat load of the autonomous driving vehicle and then accurately detect passenger seating/unseating in the autonomous driving vehicle.

In this embodiment, the seat belt change state of the autonomous driving vehicle may be obtained conveniently and effectively according to the seat belt use information of the autonomous driving vehicle, which helps more accurately determine the seat load of the autonomous driving vehicle and then accurately detect passenger seating/unseating in the autonomous driving vehicle.

In this embodiment, change states of specific vehicle components of the autonomous driving vehicle may be obtained based on a passenger's demand, and a specific seat load of the autonomous driving vehicle is then determined according to the change states of the specific vehicle components of the autonomous driving vehicle, so that the seat load of the autonomous driving vehicle can be detected in a more targeted manner, and then the reliability and accuracy of detection of passenger seating/unseating in the autonomous driving vehicle can be further improved.

In this embodiment, the door change state of the autonomous driving vehicle and the seat belt change state of the autonomous driving vehicle may be sequentially detected according to a timing relationship between the door change state of the autonomous driving vehicle and the seat belt change state of the autonomous driving vehicle, and it is determined jointly according to the two change states whether the seat load of the autonomous driving vehicle is a passenger seating state or a passenger unseating state, so as to more accurately detect passenger seating/unseating in the autonomous driving vehicle, thereby ensuring the safety and reliability of the driving of the autonomous driving vehicle.

In addition, by use of the technical solution according to this embodiment, there is no need to mount additional hardware devices, thereby reducing the operation of breaking the original equipment in the vehicle, ensuring the service life of the original equipment in the vehicle and saving the costs.

In addition, by use of the technical solution according to this embodiment, user experience can be effectively improved.

Acquisition, storage and application of users' personal information involved in the technical solutions of the present disclosure, such as travel demand information and passenger order information, comply with relevant laws and regulations, and do not violate public order and moral.

According to embodiments of the present disclosure, the present disclosure further provides an electronic device, a readable storage medium and a computer program product, and further provides an autonomous driving vehicle including the electronic device.

Figure 5:
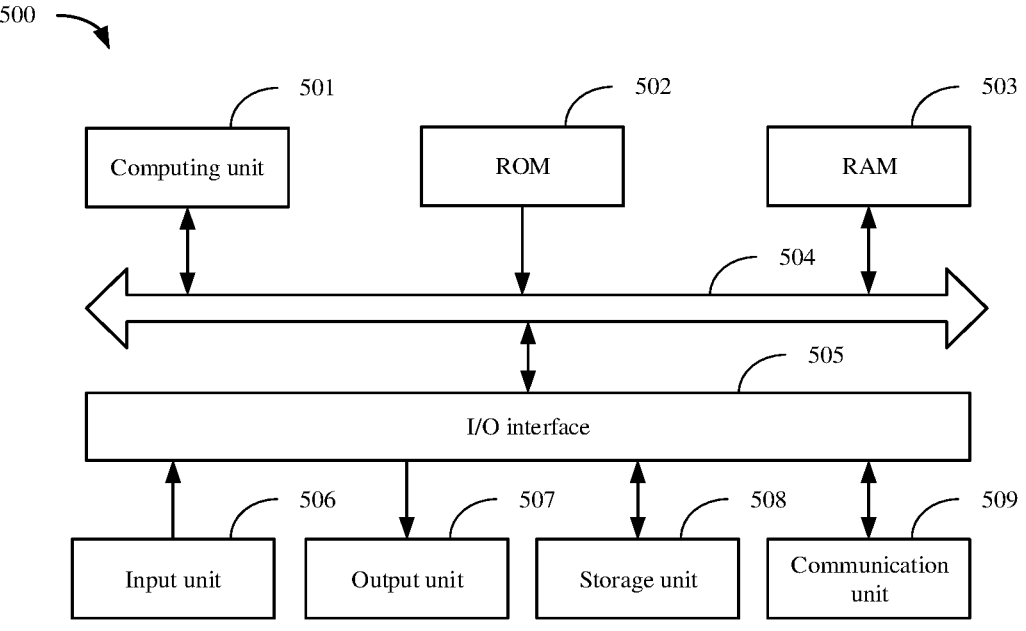
FIG. 5 is a block diagram of an electronic device configured to implement a method for detecting autonomous driving vehicle according to an embodiment of the present disclosure.

FIG. 5 is a schematic block diagram of an exemplary electronic device 500 configured to implement embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 5, the electronic device 500 includes a computing unit 501, which may perform various suitable actions and processing according to a computer program stored in a read-only memory (ROM) 502 or a computer program loaded from a storage unit 508 into a random access memory (RAM) 503. The RAM 503 may also store various programs and data required to operate the electronic device 500. The computing unit 501, the ROM 502 and the RAM 503 are connected to one another by a bus 504. An input/output (I/O) interface 505 may also be connected to the bus 504.

A plurality of components in the electronic device 500 are connected to the I/O interface 505, including an input unit 506, such as a keyboard and a mouse; an output unit 507, such as various displays and speakers; a storage unit 508, such as disks and discs; and a communication unit 509, such as a network card, a modem and a wireless communication transceiver. The communication unit 509 allows the electronic device 500 to exchange information/data with other devices over computer networks such as the Internet and/or various telecommunications networks.

The computing unit 501 may be a variety of general-purpose and/or special-purpose processing components with processing and computing capabilities. Some examples of the computing unit 501 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 501 performs the methods and processing described above, such as the method for detecting autonomous driving vehicle. For example, in some embodiments, the method for detecting autonomous driving vehicle may be implemented as a computer software program that is tangibly embodied in a machine-readable medium, such as the storage unit 508. In some embodiments, part or all of a computer program may be loaded and/or installed on the electronic device 500 via the ROM 502 and/or the communication unit 509. One or more steps of the method for detecting autonomous driving vehicle described above may be performed when the computer program is loaded into the RAM 503 and executed by the computing unit 501. Alternatively, in other embodiments, the computing unit 501 may be configured to perform the method for detecting autonomous driving vehicle by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the method in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented method for detecting occupancy in an autonomous driving vehicle, comprising:

acquiring passengers' ride information on the autonomous driving vehicle;

determining vehicle component change states of the autonomous driving vehicle according to the ride information of the autonomous driving vehicle; wherein the vehicle component change states comprise a door change state of the autonomous driving vehicle and a seat belt change state of the autonomous driving vehicle; and determining a seat load of the autonomous driving vehicle according to a timing relationship between the door change state of the autonomous driving vehicle and the seat belt change state of the autonomous driving vehicle, when a door of the autonomous driving vehicle is unlocked, prior to determining vehicle component change states of the autonomous driving vehicle according to the ride information of the autonomous driving vehicle, the computer-implemented method further comprising:

acquiring passenger order information of the autonomous driving vehicle;

determining a number of passengers served by the autonomous driving vehicle according to the passenger order information of the autonomous driving vehicle; and determining, according to the number of passengers served by the autonomous driving vehicle, vehicle components of the autonomous driving vehicle that provide services, so as to determine, according to the ride information of the autonomous driving vehicle, the vehicle component change states of the vehicle components of the autonomous driving vehicle that provide services, wherein determining the vehicle components of the autonomous driving vehicle that provide services comprising determining the door and a seat belt for providing the services according to the number of passengers served by the autonomous driving vehicle, the method further comprising:

in a case where the door change state of the autonomous driving vehicle is from a door closing state to a door opening state and then back to the door closing state, determining the seat load of the autonomous driving vehicle as a passenger seating state if the seat belt change state of the autonomous driving vehicle is from a seat belt unsafe use state to a seat belt safe use state, and starting a corresponding autonomous driving trip according to the passenger order information; and in a case where the seat belt change state of the autonomous driving vehicle is from a seat belt unsafe use state to a seat belt safe use state, determining the seat load of the autonomous driving vehicle as a passenger unseating state if the door change state of the autonomous driving vehicle is from a door closing state to a door opening state and then back to the door closing state, and entering a state of service availability of the autonomous driving vehicle.

2. The method according to claim 1, wherein the ride information of the autonomous driving vehicle comprises door use information of the autonomous driving vehicle; and the determining a vehicle component change state of the autonomous driving vehicle according to the ride information of the autonomous driving vehicle comprises:

obtaining a door state of the autonomous driving vehicle according to the door use information of the autonomous driving vehicle; and obtaining the door change state of the autonomous driving vehicle according to the door state of the autonomous driving vehicle.

3. The method according to claim 2, wherein the ride information of the autonomous driving vehicle comprises seat belt use information of the autonomous driving vehicle; and the determining a vehicle component change state of the autonomous driving vehicle according to the ride information of the autonomous driving vehicle comprises:

obtaining a seat belt state of the autonomous driving vehicle according to the seat belt use information of the autonomous driving vehicle; and obtaining a seat belt change state of the autonomous driving vehicle according to the seat belt state of the autonomous driving vehicle.

4. The method according to claim 1, wherein the ride information of the autonomous driving vehicle comprises seat belt use information of the autonomous driving vehicle; and the determining a vehicle component change state of the autonomous driving vehicle according to the ride information of the autonomous driving vehicle comprises:

obtaining a seat belt state of the autonomous driving vehicle according to the seat belt use information of the autonomous driving vehicle; and obtaining a seat belt change state of the autonomous driving vehicle according to the seat belt state of the autonomous driving vehicle.

5. An electronic device, comprising:

at least one processor; and a memory communicatively connected with the at least one processor;

wherein the memory stores instructions executable by the at least one processor, and the instructions are executed by the at least one processor to enable the at least one processor to perform a method for detecting occupancy in an autonomous driving vehicle, wherein the method comprises:

acquiring passengers' ride information on the autonomous driving vehicle;

determining vehicle component change states of the autonomous driving vehicle according to the ride information of the autonomous driving vehicle; wherein the vehicle component change states comprise a door change state of the autonomous driving vehicle and a seat belt change state of the autonomous driving vehicle; and determining a seat load of the autonomous driving vehicle according to a timing relationship between the door change state of the autonomous driving vehicle and the seat belt change state of the autonomous driving vehicle, when a door of the autonomous driving vehicle is unlocked, prior to determining vehicle component change states of the autonomous driving vehicle according to the ride information of the autonomous driving vehicle, the computer-implemented method further comprising:

acquiring passenger order information of the autonomous driving vehicle;

determining a number of passengers served by the autonomous driving vehicle according to the passenger order information of the autonomous driving vehicle; and determining, according to the number of passengers served by the autonomous driving vehicle, vehicle components of the autonomous driving vehicle that provide services, so as to determine, according to the ride information of the autonomous driving vehicle, the vehicle component change states of the vehicle components of the autonomous driving vehicle that provide services, wherein determining the vehicle components of the autonomous driving vehicle that provide services comprising determining the door and a seat belt for providing the services according to the number of passengers served by the autonomous driving vehicle, the method further comprising:

in a case where the door change state of the autonomous driving vehicle is from a door closing state to a door opening state and then back to the door closing state, determining the seat load of the autonomous driving vehicle as a passenger seating state if the seat belt change state of the autonomous driving vehicle is from a seat belt unsafe use state to a seat belt safe use state, and starting a corresponding autonomous driving trip according to the passenger order information; and in a case where the seat belt change state of the autonomous driving vehicle is from a seat belt unsafe use state to a seat belt safe use state, determining the seat load of the autonomous driving vehicle as a passenger unseating state if the door change state of the autonomous driving vehicle is from a door closing state to a door opening state and then back to the door closing state, and entering a state of service availability of the autonomous driving vehicle.

6. The electronic device according to claim 5, wherein the ride information of the autonomous driving vehicle comprises door use information of the autonomous driving vehicle; and the determining a vehicle component change state of the autonomous driving vehicle according to the ride information of the autonomous driving vehicle comprises:

obtaining a door state of the autonomous driving vehicle according to the door use information of the autonomous driving vehicle; and obtaining the door change state of the autonomous driving vehicle according to the door state of the autonomous driving vehicle.

7. The electronic device according to claim 5, wherein the ride information of the autonomous driving vehicle comprises seat belt use information of the autonomous driving vehicle; and the determining a vehicle component change state of the autonomous driving vehicle according to the ride information of the autonomous driving vehicle comprises:

obtaining a seat belt state of the autonomous driving vehicle according to the seat belt use information of the autonomous driving vehicle; and obtaining a seat belt change state of the autonomous driving vehicle according to the seat belt state of the autonomous driving vehicle.

8. A non-transitory computer readable storage medium with computer instructions stored thereon, wherein the computer instructions are used for causing a method for detecting occupancy in an autonomous driving vehicle, wherein the method comprises:

acquiring passengers' ride information on the autonomous driving vehicle;

determining vehicle component change states of the autonomous driving vehicle according to the ride information of the autonomous driving vehicle; wherein the vehicle component change states comprise a door change state of the autonomous driving vehicle and a seat belt change state of the autonomous driving vehicle; and determining a seat load of the autonomous driving vehicle according to a timing relationship between the door change state of the autonomous driving vehicle and the seat belt change state of the autonomous driving vehicle, when a door of the autonomous driving vehicle is unlocked, prior to determining vehicle component change states of the autonomous driving vehicle according to the ride information of the autonomous driving vehicle, the computer-implemented method further comprising:

acquiring passenger order information of the autonomous driving vehicle;

determining a number of passengers served by the autonomous driving vehicle according to the passenger order information of the autonomous driving vehicle; and determining, according to the number of passengers served by the autonomous driving vehicle, vehicle components of the autonomous driving vehicle that provide services, so as to determine, according to the ride information of the autonomous driving vehicle, the vehicle component change states of the vehicle components of the autonomous driving vehicle that provide services, wherein determining the vehicle components of the autonomous driving vehicle that provide services comprising determining the door and a seat belt for providing the services according to the number of passengers served by the autonomous driving vehicle, the method further comprising:

in a case where the door change state of the autonomous driving vehicle is from a door closing state to a door opening state and then back to the door closing state, determining the seat load of the autonomous driving vehicle as a passenger seating state if the seat belt change state of the autonomous driving vehicle is from a seat belt unsafe use state to a seat belt safe use state, and starting a corresponding autonomous driving trip according to the passenger order information; and in a case where the seat belt change state of the autonomous driving vehicle is from a seat belt unsafe use state to a seat belt safe use state, determining the seat load of the autonomous driving vehicle as a passenger unseating state if the door change state of the autonomous driving vehicle is from a door closing state to a door opening state and then back to the door closing state, and entering a state of service availability of the autonomous driving vehicle.

9. An autonomous driving vehicle, comprising an electronic device comprising:

at least one processor; and a memory communicatively connected with the at least one processor;

wherein the memory stores instructions executable by the at least one processor, and the instructions are executed by the at least one processor to enable the at least one processor to perform a method for detecting occupancy in an autonomous driving vehicle, wherein the method comprises:

acquiring passengers' ride information on the autonomous driving vehicle;

determining vehicle component change states of the autonomous driving vehicle according to the ride information of the autonomous driving vehicle; wherein the vehicle component change states comprise a door change state of the autonomous driving vehicle and a seat belt change state of the autonomous driving vehicle; and determining a seat load of the autonomous driving vehicle according to a timing relationship between the door change state of the autonomous driving vehicle and the seat belt change state of the autonomous driving vehicle, when a door of the autonomous driving vehicle is unlocked, prior to determining vehicle component change states of the autonomous driving vehicle according to the ride information of the autonomous driving vehicle, the computer-implemented method further comprising:

acquiring passenger order information of the autonomous driving vehicle;

determining a number of passengers served by the autonomous driving vehicle according to the passenger order information of the autonomous driving vehicle; and determining, according to the number of passengers served by the autonomous driving vehicle, vehicle components of the autonomous driving vehicle that provide services, so as to determine, according to the ride information of the autonomous driving vehicle, the vehicle component change states of the vehicle components of the autonomous driving vehicle that provide services, wherein determining the vehicle components of the autonomous driving vehicle that provide services comprising determining the door and a seat belt for providing the services according to the number of passengers served by the autonomous driving vehicle, the method further comprising:

in a case where the door change state of the autonomous driving vehicle is from a door closing state to a door opening state and then back to the door closing state, determining the seat load of the autonomous driving vehicle as a passenger seating state if the seat belt change state of the autonomous driving vehicle is from a seat belt unsafe use state to a seat belt safe use state, and starting a corresponding autonomous driving trip according to the passenger order information; and in a case where the seat belt change state of the autonomous driving vehicle is from a seat belt unsafe use state to a seat belt safe use state, determining the seat load of the autonomous driving vehicle as a passenger unseating state if the door change state of the autonomous driving vehicle is from a door closing state to a door opening state and then back to the door closing state and entering a state of service availability of the autonomous driving vehicle.

\* \* \* \* \*